April 20, 1965  E. S. WRIGHT  3,179,362
CONSTANT LOAD SUPPORT
Filed Jan. 10, 1963  3 Sheets-Sheet 1
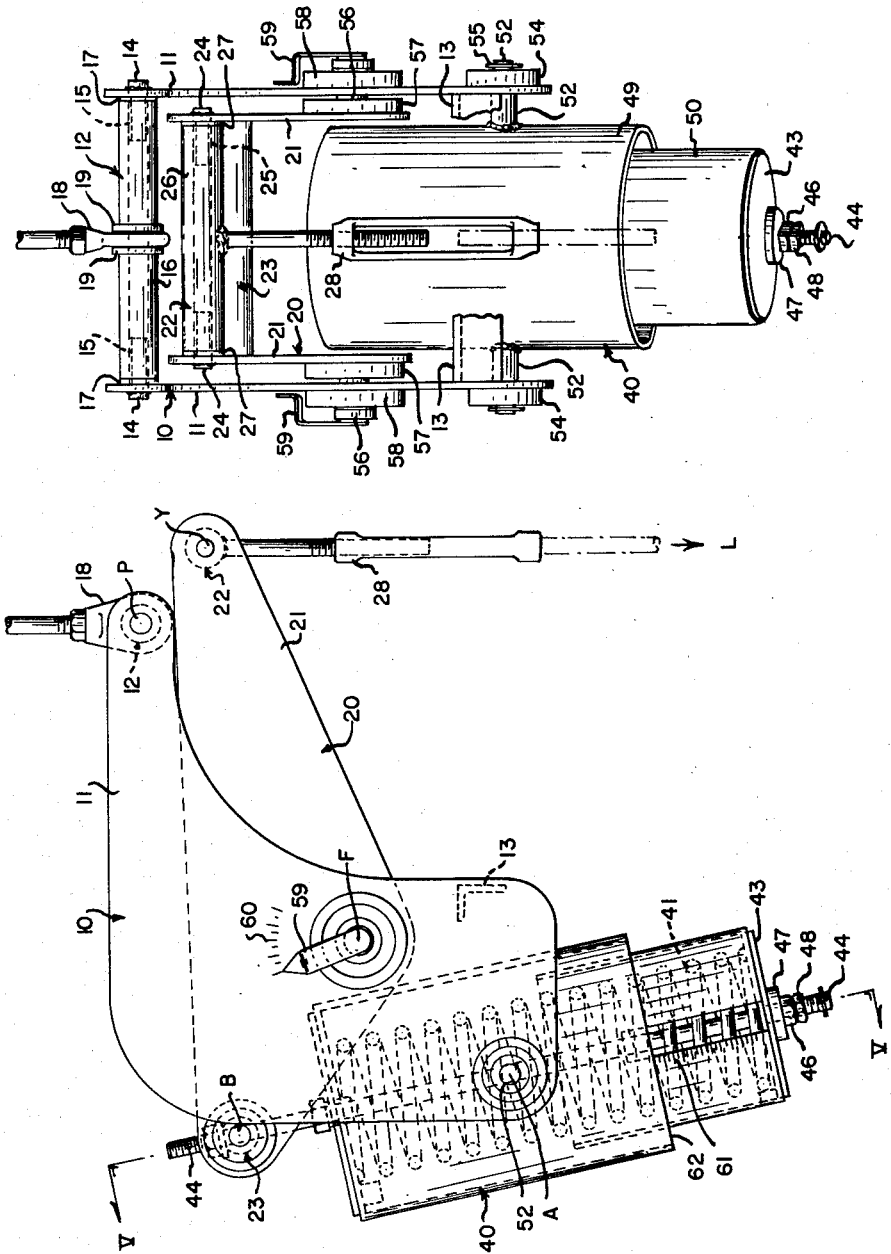
INVENTOR
Edward S. Wright April 20, 1965  E. S. WRIGHT  3,179,362
CONSTANT LOAD SUPPORT Filed Jan. 10, 1963  3 Sheets-Sheet 2

INVENTOR
Edward S. Wright
his attorneys

United States Patent Office

3,179,362
Patented Apr. 20, 1965

3,179,362
CONSTANT LOAD SUPPORT
Edward S. Wright, Mount Lebanon Township, Allegheny County, Pa., assignor to Blaw-Knox Company, Pittsburgh, Pa., a corporation of Delaware
Filed Jan. 10, 1963, Ser. No. 250,664
7 Claims. (Cl. 248—54)

This invention relates to supports for applying a substantially constant vertical support to a suspended load throughout a range of vertical movement of the load. I have found this invention particularly useful in pipe hangers to support pipelines through vertical expansion and contraction.

Constant load supports are well known and have long been used for the support of industrial piping handling steam and other fluids at elevated temperature and pressure. In such installations, greater thermal elongation and contraction of the piping is commonly found today that only a few years ago would have been quite uncommon. For example, the expansion of vertical lines by as much as a foot is not too uncommon today and the piping system therefore requires supporting means which permit this longer vertical deflection without varying the supporting force. Heretofore, constant support hangers have been both very heavy and bulky and not readily suited to installation in the small space usually available due to clearance restrictions in typical piping applications, such as in a power plant, ship, or other industrial facility which the piping serves.

Moreover, any given constant support hanger assembly as heretofore constructed has a fairly specific load-supporting rating from which there is only a slight variation available for adjustment. This limitation has necessitated carrying a large number of sizes, each limited to a narrow load supporting variation, to provide a stock of hangers from which the supplier can select proper sizes for the wide range of load capacities found required in industry.

I have devised a constant load support that is relatively compact, simple and inexpensive compared to previous constant load supports and which will give a substantially constant support to given loads through vertical travel distances as much as a foot or more and yet may be as little as half the size and weight of constant load supports of comparable capacity heretofore available for the particular load and deflection requirements. My support, moreover, may be adjusted over a substantial range of load-supporting values thus greatly reducing the number of standard sizes which must be stocked for commercial requirements. The benefits and advantages of such a support will be immediately apparent to anyone skilled in this art.

I provide a constant load support comprising a support lever, a load lever and compression spring means partly compressed, said support lever having a support arm and a spring arm, said support arm being adapted for attachment to a fixed support and said support lever spring arm having a spring pivot point at which said support lever spring arm is pivotally connected to said compression spring means, said load lever having a load arm and a spring arm, said load arm being adapted for pivotal attachment to the load to be supported and said load lever spring arm having a spring pivot point at which said load lever spring arm is pivotally connected to said compression spring means, said support and load levers being pivotally attached to each other at a fulcrum point intermediate their respective arms said spring pivot points being spaced from each other and resiliently connected by said spring means whereby as said support and load arms are pivoted apart said spring means is progressively additionally compressed, the direction and length of said spring arms being such that the axis of said spring means is always on the same side of and spaced from said fulcrum point and always forms acute angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm.

In a preferred embodiment of my invention, the two spring pivot points and the fulcrum form the corners of a triangle, two sides of which are fixed and one side of which is variable; the fixed sides being the distance between the fulcrum and each spring pivot point, and the variable side being the distance between the spring pivot points along the axis of the spring means. Preferably, the minimum length of the variable side is not less than the greater of the lengths of the fixed sides so that the angles of the triangle at the two spring pivot points are acute throughout the deformations of the triangle produced by the rotation of the load lever within the range provided, and the maximum length of the variable side (i.e., the maximum available spacing between the spring pivot points), is substantially less than the sum of said fixed sides such that the spring means is always on the same side of the fulcrum. With this configuration, the spring means applies a substantially constant load-supporting moment about the fulcrum to the load lever, as will be further explained in the detailed description with reference to the drawings.

Preferably, the support arm has a support pivot point at which said support arm is pivotally attached to the fixed support and similarly the load arm has a load pivot point at which the load arm is pivotally attached to the load. I further preferably provide that said support pivot point be horizontally located intermediate and vertically above said load pivot point and the center of gravity of the constant support at a position proportioned with respect to the horizontal location of said load pivot point and center of gravity whereby said load is substantially balanced at said support pivot point by the weight of the constant support.

I further preferably provide that all of the aforementioned pivot points have horizontal axes spaced from and parallel to each other.

Preferably, the compression spring means comprises a compression spring disposed between a fixed spring seat and a movable spring seat with a spring rod secured near one end to said movable spring seat and extending coaxially through said spring and fixed spring seat and secured near the other end to one of said spring pivot points, said fixed spring seat being secured to the other of said spring pivot points whereby said spring arms are resiliently interconnected such that as said support and load arms are pivoted apart said spring is progressively additionally compressed.

Preferably, I also provide means operative to independently and selectively vary the spacing between said spring pivots without varying the degree of spring compression thereby selectively rotating said spring axis toward or away from said fulcrum and adjusting the value of constant load provided by the constant load support.

In addition, I preferably provide indicator means comprising pointer means movable with one of said load and support levers and cooperative with measuring indicia disposed on the other of said load and support levers to indicate the vertical disposition of said load arm with respect to said support arm.

Although this specification generally describes my invention in a pipeline locus, it should be clearly understood that the invention is not limited to this use but may readily be used in many other applications such as in moving large components into exact position where the load is constant, and careful limited vertical movement and positioning of the load is desirable.

Other details, objects and advantages of the invention will become apparent as the following description of a certain present preferred embodiment thereof proceeds.

In the accompanying drawings, I have shown a certain present preferred embodiment of the invention in which FIGURE 1 is a side elevational view of the device;

FIGURE 2 is an end elevational view of the device as viewed from the right of FIGURE 1;

Figure 3:
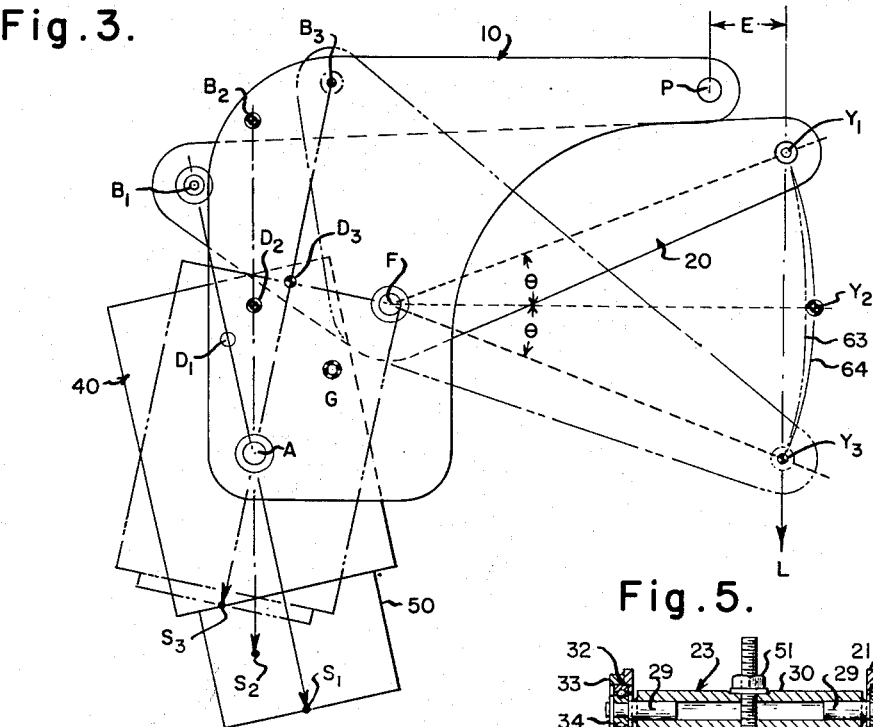
FIGURE 3 is a schematic diagram illustrating the mechanics of the device.
Figure 4:
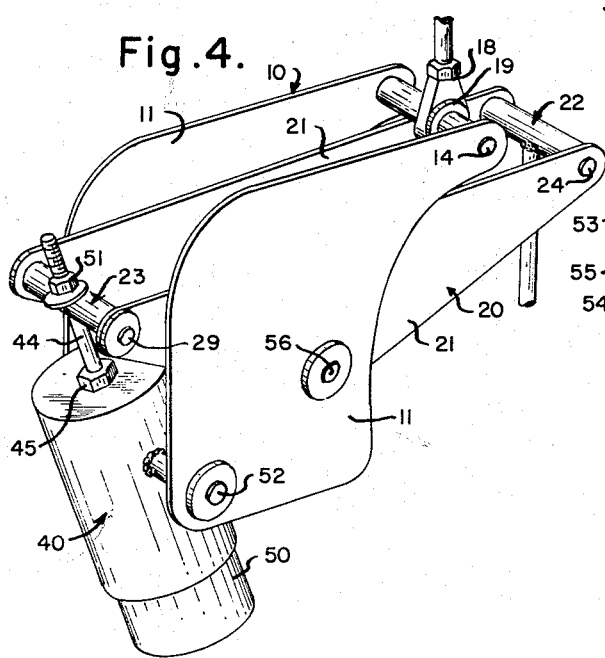
FIGURE 4 is a perspective view of the device.

Referring to the drawings and initially to FIGURES 1 and 2, I provide generally a support lever 10, a load lever 20 and spring means 40. Support lever 10 comprises a pair of spaced plates 11 with a yoke 12 and a stop bar 13 extending therebetween. Yoke 12 is disposed near one end of support lever 10 and is adapted for attachment to a fixed support (not shown) such as, for example, a support beam in a building. This attachment may be rigid or, as illustrated, may be pivotal. Preferably, the attachment is pivotal for reasons which will subsequently be more fully explained, and for this purpose I provide a yoke 12 comprising journal pins 14 inserted through suitable openings in plates 11 and secured therein as by welding, the inner ends of which extend into bearing bushings 15 pressed into the ends of tubular shafts 16. Washers 17 are disposed on pins 14 between the shaft ends and plates 11. Yoke 12 is thus pivotable with support lever 10 along an axis hereinafter designated as support pivot P. Yoke 12 is further provided with an eyebolt 18 through the eye of which tubular shaft 16 passes and which is held centered thereon by a pair of retaining rings 19 secured to shaft 16 as by welding. Eyebolt 18 is attached to the fixed support and it too is pivotal with yoke 12 along the axis designated as support pivot P.

Load lever 20 comprises a pair of spaced plates 21 with a pair of yokes 22 and 23 extending therebetween and pivotally mounted therein near each of the respective ends of load lever 20 at pivot points B and Y respectively.

Similar to yoke 12, yoke 22 comprises a pair of journal pins 24 secured in suitable openings in plates 21 as by welding, the inner ends of which extend into bearing bushings 25 pressed into the ends of tubular shaft 26. Washers 27 are disposed on pins 24 between the ends of shaft 26 and plate 21. Thus, yoke 22 is pivotable in load lever 20 about the pivot axis designated as load pivot Y. A turnbuckle 28 is secured to shaft 26 as by welding, although the eyebolt arrangement shown with respect to yoke 12 would be suitable too. Turnbuckle 28 is adapted for attachment to the load (not shown but simply designated as L) to be supported.

Figure 5:
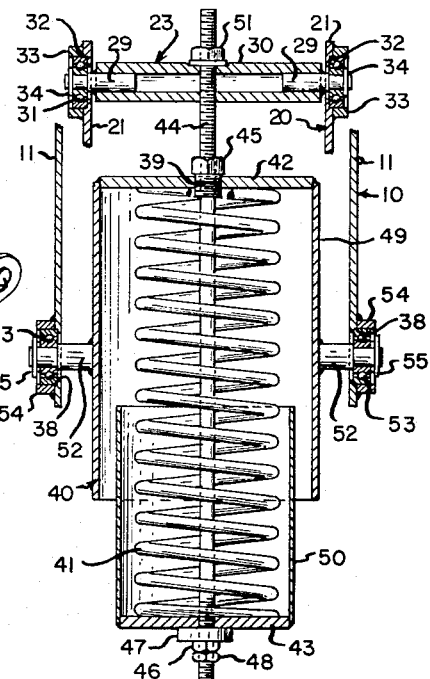
FIGURE 5 is a transverse cross-sectional view partly in elevation taken along the line V—V of FIGURE 1.

As best shown in FIGURE 5, yoke 23 comprises journal pins 29, secured in the ends of tubular shaft 30 as by welding, the free ends of which extend through suitable openings in plates 21 and are journaled in bearings, such as self aligning double ball or roller bearings 31, which are secured in recesses 32 of plates 21 adjacent the pin openings by the rings 33 secured to plates 21 and the retaining rings 34 secured on the outer ends of pins 29. Thus, yoke 23 is pivotable with respect to load lever 20 about the pivotal axis designated as spring pivot B (see FIGURE 1).

Continuing to refer to FIGURE 5, spring means 40 comprises a compression spring 41 disposed between spring seats 42 and 43 with a spring rod 44 extending coaxially therethrough. One end of spring rod 44 is secured to spring seat 43 by a nut 46 with a thrust bearing 47 disposed therebetween. From spring seat 43, spring rod 44 extends coaxially through spring 41 and slideably through a bushed central opening in spring seat 42. A stop nut 45 is secured to spring rod 44 against which spring seat 42 bears through the flanged bushing 39. It will be understood that spring 41 may thus be precompressed to any desired degree by simply turning nut 46. The lock nut 48 is provided to prevent any inadvertent adjustment. I further provide cylindrical housing members 49 and 50 which are secured as by welding to spring seats 42 and 43 respectively. As illustrated, housing member 50 telescopes into housing member 49.

As further shown in FIGURE 5, the threaded end of spring rod 44 extending through spring seat 42 is elongated to extend through a suitable central opening in pipe 30 of yoke 23 and is secured thereto in adjusted position by the nut 51. Thus, spring means 40 is attached to load lever 20 and is pivotable therewith about spring pivot B.

I also provide for the pivotal attachment of spring means 40 to support lever 10. This is also shown in FIGURE 5 wherein a pair of trunnion pins 52 are secured such as by welding to housing member 49. Trunnion pins 52 extend through suitable openings in plates 11 and are journaled in bearings 53, which, a illustrated, are self aligning double ball bearings which are secured in recesses 38 of plates 11 by rings 54 secured to plates 11 and retaining rings 55 secured to the ends of pins 52. Thus, spring means 40 is attached to support lever 10 and is pivotable therewith about a pivot axis designated as spring pivot A. From the foregoing it can be understood that movement of spring rod 44 along its longitudinal axis will move spring seat 43 but not spring seat 42. Thus, in this respect spring seat 43 is movable and spring seat 42 is fixed and such movement of spring rod 44 will vary the degree of compression of spring 41.

It should be noted that support pivot P and spring pivot A are near opposite ends of support lever 10, that load pivot Y and spring pivot B are near opposite ends of load lever 20 and that spring pivots A and B and consequently support lever 10 and load lever 20 are resiliently connected through spring means 40. Support lever 10 and load lever 20 are also directly connected. This latter connection is located with respect to each lever at a fulcrum pivot F intermediate the earlier described pivots. As best shown in FIGURE 2, I provide stub shafts 56 which are secured, as by welding, to plates 21 of load lever 20 which attachment may be reinforced by the ring plates 57. Stub shafts 56 extend therefrom through plates 11 of support lever 10 and are journaled in bearings 58 which are identical to bearings 53 and are secured to plates 11 similarly as earlier described with respect to bearings 53. Thus, support lever 10 and load lever 20 are directly attached to one another and are pivotal with respect to each other about the axis designated as fulcrum pivot F. It should be noted that all of the axes of the pivots are spaced from and parallel to each other.

From the foregoing, it is clear that when load lever 20 pivoted at pivot F rotates so that load pivot Y moves away from support pivot P (i.e., clockwise as shown in FIGURE 1), that spring pivot B moves away from spring pivot A and that consequently spring rod 44 additionally compresses spring 41. It is equally clear that when load lever 20 is rotated about fulcrum pivot F the other way (i.e., counterclockwise), just the opposite occurs.

As shown in FIGURE 1, I further provide on at least one side or, as illustrated in FIGURE 2, on both sides of my support, indicator pointers 59 which are secured as by welding to shafts 56 on the outside of plates 11 so that they swing directly with the movement of load lever 20 to which they are attached through shafts 56. Appropriate measuring indicia 60 (see FIGURE 1) are disposed on the outside of plates 11 adjacent pointers 59 to cooperate therewith in indicating the degree of movement that occurs.

I also provide load indicia scales 61 disposed on the outside of housing member 50 so as to cooperate with the edge 62 of housing member 49 in indicating the degree of compression of spring 41. This is useful in finely adjusting and setting initial spring compression when my constant support is first installed.

It is obvious in viewing FIGURE 1, that spring means 40 could be inverted so that trunnions 52 would be pivoted at spring pivot B and yoke 23 pivoted at spring pivot A. I prefer the arrangement shown and described, however, because it places the heavier and larger portion of spring means 40 below, which conserves head room for my device and also drops the center of gravity of my device to a lower and better balancing position with respect to support pivot P.

As is clear from the above description, support lever 10 and load lever 20 are pivoted together in a manner somewhat analogous to a pair of scissors, each lever having a pair of arms extending from the fulcrum pivot F and that as the load L (such as a pipe line) shifts in its vertical disposition, load lever 20 will pivot with it and thus increase or decrease, as the case may be, the compression of spring 41. As shown in FIGURE 3, support lever 10 has an arm from fulcrum pivot P to support pivot P (hereinafter called "support arm FP") and an arm from fulcrum pivot F to spring pivot A (hereinafter called "support spring arm FA"), while the load lever 20 has an arm from fulcrum pivot F to load pivot Y (hereinafter called "load arm FY") and another arm from fulcrum pivot F to spring pivot B (hereinafter called "load spring arm FB").

In application, support lever 10 is attached to a support through eyebolt 18 and load lever 20 is attached to the load to be supported, such as a pipe in a pipeline, through the turnbuckle 28 and appropriate clamping elements (not shown). Spring 41 is of a size selected in accordance with the load to be supported and is precompressed between spring seats 42 and 43 to the degree necessary to balance the load in normal position. After installation, any variation between actual load and estimated load can be offset by adjusting the load on spring 41 through nut 46. Load variation will rarely exceed 10% and such variations can readily be cured in this manner. Once the desired support to the load is established as above described, then this desired support to the load will remain substantially constant even though the load may travel vertically from one position to another within the travel range limitations of the particular support. The travel limitations of the support are established by the yoke 12 at its upper limit as load lever 20 cannot travel above yoke 12 and by stop bar 13 at its lower limit which stops load lever 20 from traveling below that point. This travel range, of course, is preselected in accordance with the nature of the installation and rarely would exceed 12 inches and more often would be only 6 inches or even 3 inches. The support shown in the drawings illustrates a support selected for a travel range of 12 inches and supports constructed in accordance with my invention for lesser ranges would have shorter support arms (FP) and load arms (FY) in accordance with the lesser travel requirement for load pivot Y.

The mechanics of my constant support will be readily understood by those skilled in the art, and referring to the diagrammatic showing of my support in FIGURE 3, it may be explained as follows:

L is the load;
$\theta$ is the angle of the load arm to the horizontal in high and low positions;
$FY_1 \cos \theta$, $FY_2$, and $FY_3 \cos \theta$ are the load moment arms at high, mid and low positions, respectively, of load arm FY: $S_1$, $S_2$ and $S_3$ are the spring forces along the lines $AB_1$, $AB_2$ and $AB_3$ at said high, mid and low positions, respectively, and $FD_1$, $FD_2$ and $FD_3$ are the spring moment arms at said high, mid and low positions respectively. For the support to be constant, the moment of the weight of the load times the length of the load movement arm, which as illustrated is clockwise about F, must always be balanced by a substantially equal counterclockwise moment of the spring force times the spring moment arm. Thus, with the load at high position, $$L \times FY_1 \cos \theta = S_1 \times FD_1$$

at mid position $$L \times FY_2 = S_2 \times FD_2$$

and at low position $$L \times FY_3 \cos \theta = S_3 \times FD_3$$

It should be particularly noted that the direction and length of the respective arms is such that as pivot point Y travels the full length of its range, the longitudinal axis AB of spring means 11 is always on the same side of and spaced from fulcrum pivot F. Thus, the spring moment arms from $FD_1$ through $FD_3$ are always positive and countering the load moment.

It should also be particularly noted that the angles formed by load spring arm FB and support spring arm FA with the longitudinal axis of the spring means AB (namely, angles BAF and ABF) are always acute throughout the range of travel of load lever 20 whereby spring pivot B follows a rather flat arcuate path of inclined travel with respect to spring pivot A. Spring pivot B's travel pattern with respect to spring pivot A is somewhat analogous to the action of a cam and it can be understood that because of this cam-like action, the distance AB changes considerably less than it otherwise would over the full range of pivot point Y. Thus, since elongation of AB is accomplished through compression of spring 41, a much lower spring travel requirement is produced which contributes substantially to the lighter spring means that may be used with my invention (in the larger size hangers, up to 50% smaller than spring means commonly used heretofore) to accomplish the same result. The savings in weight and space are immediately apparent.

The acute angles mentioned above are obtained by spacing load spring pivot B and support spring pivot A at a minimum distance (i.e., when spring 41 is fully extended) of not less than the lengths of either of arms FA and FB; and preferably, somewhat further apart than the greater of these lengths, and at a maximum distance (i.e., when spring 41 is fully compressed) of less than the sum of the lengths of arms FA and FB and preferably substantially less than this sum.

It should be further noted that the load moment is nearly the same over the travel range of load pivot Y. It is slightly greater at mid position because $FY_2$ is longer than $FY_1 \cos \theta$ and $FY_3 \cos \theta$ which are the same. On the other hand, spring means axis AB is lengthened as load arm FY moves from high position to low position (i.e., $AB_3$ is greater than $AB_2$ which is greater than $AB_1$) which further compresses spring 26 and thereby increases the spring force applied to the spring moment arm; however, this increase is compensated for by corresponding decreases in the length of the spring moment arm, (i.e., $FD_3$ is shorter than $FD_2$ which is shorter than $FD_1$) so that the spring moment likewise remains substantially the same over the range of travel to effectively counterbalance the substantially constant load moment.

By way of example of a constant support embodying my invention, let us consider a constant support to be used to support a load of 991 pounds over a vertical travel range of 12 inches. The radius of the arc through which the load travels (FY) is 15.7 inches. At high position, the load moment arm $FY_1 \cos \theta$ is 14.5 inches; at mid-position, the load moment arm $FY_2$ becomes the radius of the arc or 15.7 inches; and, at low position the load moment arm $FY_3 \cos \theta$ is again 14.5 inches. The load moment at high and low positions is, therefore, 14.5 inches × 991 pounds or 14,369.5 in. lbs. and at mid-position is 15.7 × 991 pounds or 15,558.7 in. lbs.

Let us now consider the balancing moment produced about fulcrum point F by the spring force. The spring moment arm varies from 6.25 inches at high position $FD_1$ to 5.15 inches at mid-position $FD_2$ to 3.8 inches at low position $FD_3$. The total spring travel (which is the amount spring 41 is compressed) from high to low position of the load arm is 4 inches, i.e., $AB_3$ is 4 inches longer than $AB_1$, and at mid-position of the load arm, $AB_2$ is 2.24 inches longer than $AB_1$.

From the example noted above, we know the value of the moment that must be produced by the spring to balance the moment produced by the load and therefore can solve for the spring forces required at the high and low positions as follows:

High position:

$$S_1 = \frac{\text{load moment}}{\text{spring moment arm } FD_1}$$

$$S_1 = \frac{14,369.5 \text{ in. lbs.}}{6.25 \text{ in.}} = 2299 \text{ lbs.}$$

Low position:

$$S_3 = \frac{\text{load moment}}{\text{spring moment arm } FD_3}$$

$$S_3 = \frac{14,369.5 \text{ in. lbs.}}{3.81 \text{ in.}} = 3771 \text{ lbs.}$$

From this, the spring rate K may be computed as follows:

$$K = \frac{S_3 - S_1}{\text{spring travel}} = \frac{(3771-2299) \text{ pounds}}{4 \text{ inches}} \text{ or } 368 \text{ lbs./in.}$$

In order to produce the required 2299 pounds when the load is in high position, the spring must be precompressed, accordingly:

$$C = \frac{S_1}{K} = \frac{2299 \text{ lbs.}}{368 \text{ lbs./in.}} = 6.25 \text{ inches}$$

Thus a spring having a spring rate of 368 lbs./in. which has been precompressed 6.25 inches gives the required 2299 pounds of force at load arm high position and 3771 pounds of force at load arm low position.

Checking on the spring moment at mid-position (i.e., after 6 inches of load arm travel) will show the maximum variation present.

$$S_2 = [S_1 + (\text{spring travel} \times K)](FD_2)$$
$$S_2 = [2299 \text{ lbs.} + (2.24 \text{ in.} \times 368 \text{ lbs./in.})]5.15 \text{ in.}$$
$$S_2 = (3123 \text{ lbs.})(5.15 \text{ in.}) = 16,083.5 \text{ in./lbs.}$$

The percent variation (V) from constant therefore is $$V = \frac{16,083.5 - 15,558.7}{15,558.7} \times 100 \text{ or } 3.4\%$$

a percentage well within the permissible variation accepted in the art.

Checking this computation, the support load at mid-position is as follows:

$$L = \frac{S_2}{FY_2} = \frac{16,083.5}{15.7} = 1024.4 \text{ lbs.}$$

$$V = \frac{1024.4 - 991}{991} \times 100 \text{ or } 3.4\%$$

By varying the length AB in FIGURE 1 by means of adjusting only the nut 51, the spring axis AB may be rotated about A (towards or away from the fulcrum F) without varying the pre-compression of the spring 41, and at the same time the high position of the load yoke Y will be raised or lowered. By providing a range of vertical travel for Y greater than the required distance, the available overtravel permits the same hanger to be adjusted to accommodate a variety of different predetermined constant loads merely by adjusting nut 51.

For example, if an angular travel of the load lever 20 through 45° be necessary to accommodate deflection of the supported piping from hot to cold position, but the hanger structure is proportioned to provide a total of 70° angular deflection of the load lever 20, the hanger may then have three different ratings; one for a 45° travel of lever 20 between positions each 22½° above the horizontal (hereinafter called the "mean rating"), one for a 45° travel, 35° of which is above horizontal and 10° of which is below horizontal (hereinafter called "high rating") and one for a 45° travel, 10° of which is above horizontal and 35° of which is below horizontal (hereinafter called "low rating"). Typically, in high rating position the hanger may support a constant load 20% greater than in mean rating position, and in low rating position the constant load may be 20% less than that supported in mean positions.

Figure 6:
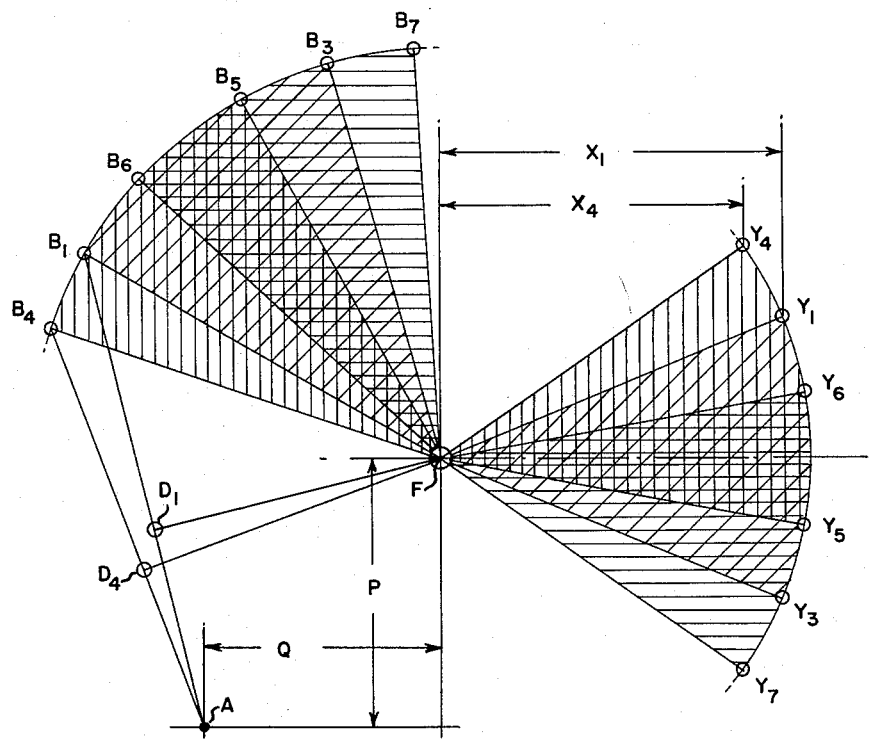
FIGURE 6 is a diagram similar to FIGURE 3 particularly illustrating an adjustment feature.

This is illustrated diagrammatically by FIGURE 6 in which the points A, $B_1$, $B_3$, $Y_1$, $Y_2$ and F correspond to the points marked with the same legends on FIGURE 3, the distance $X_1$ corresponds to $FY_1 \cos \theta$ in FIGURE 3 (X generally representing the load moment arm), with it being understood that the omitted structure in FIGURE 6 is the same as in FIGURES 1 and 3. The arcs $Y_4-Y_7$ and $B_4-B_7$ are substantially 70°, the total range of travel admitted to the load lever. The diagonally shaded segments $Y_1-Y_3$ and $B_1-B_3$ in FIGURE 6 represent the 45° mean rating movement; the horizontally shaded segments $Y_6-Y_7$ and $B_6-B_7$ represent the 45° low rating, and the vertically shaded segments $B_4-B_5$ and $Y_4-Y_5$ represent the 45° high rating movement.

As a numerical example, let the radius FY be 7.846" and the radius FB be 7.655", and let the location of the spring pivot A with respect to fulcrum F be $P=5.664"$ and $Q=5.150"$. The spring connecting pivots A and B is further here specified to have a constant of 167 lbs. per inch deflection and it is also specified that the precompression of the spring has been set, by adjusting nut 46, at 1044 lbs., which is not varied by adjusting nut 51 to locate the spring yoke pivot selectively at $B_1$, $B_4$ or $B_6$, as the case may be. The movement of B through arcs $B_1-B_3$, $B_4-B_5$ or $B_6-B_7$, as the case may be, further compresses the spring to a final loading of 1713 lbs. Hence whether the hanger is adjusted to operate at mean, high or low rating, the spring compression varies through the same range, 1044 to 1713 lbs., on the 45° rated deflection of the load lever. The spring moment arm FD, however, has different terminal values in these different ranges, as set forth in the tabulation which follows and further shows the value of my constant load support:

| Range | Load yoke position | Spring force | Spring mom. arm | Load mom. arm | Support load value, lbs. |
|---|---|---|---|---|---|
| Mean | $Y_1$ | $S_1=1049\#$ | $FD_1=6.29"$ | $X_1=7.25"$ | 901 |
|  | $Y_3$ | $S_3=1713\#$ | $FD_3=3.81"$ | $X_3=7.25"$ | 901 |
| High | $Y_4$ | $S_4=1049\#$ | $FD_4=6.24"$ | $X_4=6.43"$ | 1,013 |
|  | $Y_5$ | $S_5=1713\#$ | $FD_5=4.58"$ | $X_5=7.74"$ | 1,013 |
| Low | $Y_6$ | $S_6=1049\#$ | $FD_6=5.83"$ | $X_6=7.74"$ | 788 |
|  | $Y_7$ | $S_7=1713\#$ | $FD_7=2.95"$ | $X_7=6.43"$ | 788 |

Referring now to FIGURE 3, it will be noted that load pivot Y is horizontally offset from the support pivot P through a distance marked E on the side opposite the main body of the structure. The center of gravity (G) of the support as a whole is on the opposite side of support pivot P from load pivot Y, and well below support pivot P such that the weight of the support may counterbalance the load applied at load pivot Y. In actual hangers constructed according to my invention, the center of gravity was located experimentally and found to be near the fulcrum F as indicated in FIGURE 3, but the precise location of the center of gravity is not critical and this observation is made merely to indicate where it was actually found in some instances. The magnitude of the offset E depends upon the design load of the hanger, its weight and the location of its center of gravity and is made a distance at which the assembled structure balances substantially in the position shown in FIGURE 3 with the design load applied to load pivot Y.

Slight variation of the actual load at load pivot Y causes the entire structure to rock slightly about support pivot P, whereby the center of gravity (rotating about support pivot P) moves towards or away from a vertical line through support pivot P following the arc to which the center of gravity of the hanger is confined in any such movement. This increases or decreases the balancing moment of the weight of the hanger about support pivot P. Such rocking at the same time varies the horizontal offset E generally reciprocally to variation in the moment created by the weight of the hanger, so that the assembly comes to a new equilibrium position of balance through relatively small angular deflections of the hanger about support pivot P resulting from said variations in the load moment; and the hanger is therefore self-balancing bodily through very small bodily deflections to correct any load moment variation.

The pivotal action about support pivot P has a further advantage in that it permits load pivot Y to travel more nearly in a vertical line than would otherwise be possible. As in the numerical example previously set forth, the load moment is greatest at mid-position (although well within required tolerances) and the hanger therefore rotates slightly about support pivot P in a clockwise direction (as seen in FIGURE 3) as the load lever arm FY moves from top to mid-position, due to the increasing load moment, and thereafter rotates slightly about support pivot P in a counterclockwise direction as arm FY continues from mid-position to low position and the load moment decreases. This causes the fulcrum pivot F to shift back and forth slightly as load pivot Y moves and the actual path of load pivot Y (as shown in chain line reference 63 in FIGURE 3) has less curvature than the theoretical arc (shown in solid line reference 64 in FIGURE 3) which is based on fulcrum pivot F remaining stationary so that the actual variation (V) would be less than the 3.4% of the example.

It is to be borne in mind that, as will have been clear from the numerical example, the magnitude of the supporting force is fixed by the spring characteristics and by the configuration of the components pivotally connected as disclosed; and that the gravity self-balancing feature just described above does not determine or control the supporting load (although the value of E must be selected on the basis of that load) but rather provides a degree of self-orientation of the hanger bodily with reference to the structures to which the hanger is connected, not otherwise obtainable without this feature.

While I have shown and described a present preferred embodiment of the invention, it is to be distinctly understood that the invention is not limited thereto but may be otherwise variously embodied within the scope of the following claims.

I claim:

1. A constant load support comprising a support lever, a load lever and compression spring means partly compressed, said support lever having a support arm and a spring arm, said support arm being adapted for attachment to a fixed support and said support lever spring arm having a spring pivot point at which said support lever spring arm is pivotally connected to said compression spring means intermediate the ends thereof, said load lever having a load arm and a spring arm, said load arm being adapted for pivotal attachment to the load to be supported, said load lever spring arm having a spring pivot point at which said load lever spring arm is pivotally connected to said compression spring means, said support and load levers being pivotally attached to each other at a fulcrum point intermediate their respective arms, said spring pivot points being spaced from each other and resiliently connected by said spring means whereby as said support and load arms are pivoted apart said spring means is progressively additionally compressed, the direction and length of said spring arms being such that the axis of said spring means is always on the same side of and spaced from said fulcrum point and always forms acute angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm.

2. A constant load support comprising a support lever, a load lever and compression spring means partly compressed, said support lever having a support arm and a spring arm, said support arm being adapted for attachment to a fixed support and said support lever spring arm having a spring pivot point at which said support lever spring arm is pivotally connected to said compression spring means intermediate the ends thereof, said load lever having a load arm and a spring arm, said load arm being adapted for pivotal attachment to the load to be supported, said load lever spring arm having a spring pivot point at which said load lever spring arm is pivotally connected to said compression spring means, said support and load levers being pivotally attached to each other at a fulcrum point intermediate their respective arms, said spring pivot points being spaced from each other and resiliently connected by said spring means whereby as said support and load arms are pivoted apart said spring means is progressively additionally compressed, the direction and length of said spring arms being such that said spacing between said spring pivot points is a minimum of not less than the greater of the distances from each of said spring pivot points to said fulcrum and a maximum of substantially less than the sums of the distances from each of said spring pivot points to said fulcrum so that the axis of said spring means is always on the same side of and spaced from said fulcrum point and always forms acuate angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm.

3. A constant load support comprising a support lever, a load lever and compression spring means partly compressed, said support lever having a support arm and a spring arm, said support arm having a support pivot point at which said support arm is adapted for pivotal attachment to a fixed support and said support lever spring arm having a spring pivot point at which said support lever spring arm is pivotally connected to said compression spring means, said load lever having a load arm and a spring arm, said load arm having a load pivot point at which said load arm is adapted for pivotal attachment to the load to be supported and said load lever spring arm having a spring pivot point at which said load lever spring arm is pivotally connected to said compression spring means, said support and load levers being pivotally attached to each other at a fulcrum point intermediate their respective arms, said spring pivot points being spaced from each other and resiliently connected by said spring means whereby as said support and load arms are pivoted apart said spring means is progressively additionally compressed, the direction and length of said spring arms being such that the axis of said spring means is always on the same side of and spaced from said fulcrum point and always forms acute angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm, said support pivot point being disposed horizontally intermediate and vertically above said load pivot point and the center of gravity of the constant support, at a position proportional with respect to the horizontal location of said load pivot point and center of gravity whereby said load is balanced at said support pivot point by the weight of the constant support.

4. A constant load support comprising a support lever, a load lever and compression spring means partly compressed, said support lever having a support arm and a spring arm, said support arm having a support pivot point at which said support arm is adapted for pivotal attachment to a fixed support and said support lever spring arm having a spring pivot point at which said support lever spring arm is pivotally connected to said compression spring means, said load lever having a load arm and a spring arm, said load arm having a load pivot point at which said load arm is adapted for pivotal attachment to the load to be supported said load lever spring arm having a spring pivot point at which said load lever spring arm is pivotally connected to said compression spring means, said support and load levers being pivotally attached to each other at a fulcrum point intermediate their respective arms, said spring pivot points being spaced from each other and resiliently connected by said spring means whereby as said support and load arms are pivoted apart said spring means is progressively additionally compressed, the direction and length of said spring arms being such that said spacing between said spring pivot points is a minimum of not less than the greatest of the distances from each of said spring pivot points to said fulcrum and a maximum of substantially less than the sums of the distances from each of said spring pivot points to said fulcrum so that the axis of said spring means is always on the same side of and spaced from said fulcrum point and always forms acute angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm, said support pivot point being located horizontally intermediate and vertically above said load pivot point and the center of gravity of the constant support, at a position proportional with respect to the horizontal location of said load pivot point and center of gravity whereby said load is balanced at said support pivot point by the weight of the constant support.

5. A constant load support comprising a support lever, a load lever and compression spring means partly compressed, said support lever having a support arm and a spring arm, said support arm having a support pivot point at which said support arm is adapted for pivotal attachment to a fixed support and said support lever spring arm having a spring pivot point at which said support level spring arm is pivotally connected to said compression spring means, said load lever having a load arm and a spring arm, said load arm having a load pivot point at which said load arm is adapted for pivotal attachment to the load to be supported said load lever spring arm having a spring pivot point at which said load lever spring arm is pivotally connected to said compression spring means, said support and load levers being pivotally attached to each other at a fulcrum point intermediate their respective arms, said spring pivot points being spaced from each other and resiliently connected by said spring means, said spring means including a compression spring disposed between a fixed spring seat and a movable spring seat with a spring rod secured near one end to said movable spring seat and extending coaxially through said spring and fixed spring seat and secured near the other end to one of said spring pivot points, said fixed spring seat being secured to the other of said spring pivot points whereby as said support and load arms are pivoted apart said spring means is progressively additionally compressed, the direction and length of said spring arms being such that said spacing between said spring pivot points is a minimum of not less than the greatest of the distances from each of said spring pivot points to said fulcrum and a maximum of substantially less than the sums of the distances from each of said spring pivot points to said fulcrum so that the axis of said spring means is always on the same side of and spaced from said fulcrum point and always forms acute angles at the spring pivot points with each of said spring arms whereby as said load arm is pivoted with respect to said support arm the spring pivot point of said load lever spring arm describes an inclined relatively flat arcuate path of travel with respect to the spring pivot point of said support lever spring arm, said support pivot point being located horizontally intermediate and vertically above said load pivot point and the center of gravity of the constant support, at a position proportional with respect to the horizontal location of said load pivot point and center of gravity whereby said load is balanced at said support pivot point by the weight of the constant support.

6. A constant load support as claimed in claim 1 including means operative to independently and selectively vary the spacing between said spring pivots without varying the degree of spring compression, thereby selectively rotating said spring axis toward or away from said fulcrum and adjusting the value of constant load provided by the constant load support.

7. A constant load support as claimed in claim 1 including indicator means comprising pointer means movable with one of said load and support levers and cooperative with measuring indicia disposed on the other of said load and support levers to indicate the vertical disposition of said load arm with respect to said support arm.

References Cited in the file of this patent
UNITED STATES PATENTS

| | | |
|---|---|---|
| 2,568,149 | Grabe | Sept. 18, 1951 |
| 2,896,888 | Wood | July 28, 1959 |
| 2,946,547 | Grabe | July 26, 1960 |
| 2,995,326 | Wood | Aug. 8, 1961 |

CLAUDE A. LEROY, *Primary Examiner.*